United States Patent [19]

Drapeau et al.

[11] 4,346,453

[45] Aug. 24, 1982

[54] ITEM DISPLAY ORDER PICKING SYSTEM

[75] Inventors: Raoul E. Drapeau, Vienna; William M. Stone, Reston, both of Va.

[73] Assignee: Scope Incorporated, Reston, Va.

[21] Appl. No.: 97,169

[22] Filed: Nov. 26, 1979

[51] Int. Cl.³ .............................................. G06F 3/04
[52] U.S. Cl. ..................................... 364/900; 186/56; 340/825.35
[58] Field of Search ... 364/200 MS File, 900 MS File; 340/147 A; 186/56

[56] References Cited

U.S. PATENT DOCUMENTS

| | | | |
|---|---|---|---|
| 3,532,184 | 10/1970 | Blake | 186/56 |
| 3,732,544 | 5/1973 | Obland | 364/200 |
| 3,739,339 | 6/1973 | Hillhouse et al. | 340/147 A |
| 3,780,907 | 12/1973 | Colburn et al. | 186/56 |
| 3,908,800 | 9/1975 | Drapeau | 186/56 |
| 4,034,339 | 7/1977 | Free et al. | 364/900 |
| 4,052,702 | 10/1977 | Smith et al. | 364/200 |

*Primary Examiner*—Harvey E. Springborn
*Attorney, Agent, or Firm*—John E. Benoit

[57] ABSTRACT

A semi-automatic picking system having pick modules associated with individual compartments of storage bays includes a switch, for manually decrementing or incrementing the module to indicate the number picked. One or more orders may be picked at the same time. Such information is stored for use with a data input device and a control unit.

3 Claims, 6 Drawing Figures

ITEM DISPLAY ORDER PICKING SYSTEM

The present invention relates generally to an item selecting system and more particularly to an item display order picking system which assists manual picking of the required items.

BACKGROUND OF THE INVENTION

Flow rack picking is common for those distribution operations having a high order line volume. However, the picking throughput and accuracy are limited if the pickers are using hard copy documents to guide them in their selections of the various items. In some cases, such operations have been completely automated. However, in many cases, the product type or the order volume of the operation is not suitable for such complete automation. This is true particularly for broken case picking of varied size and shape goods.

Some semi-automated systems have been proposed and are in use. One such system is described in U.S. Pat. No. 3,908,800 issued Sept. 30, 1975 and assigned to the present assignee. That particular system discloses the use of the mobile cart having specific indicators thereon which disclose the quantity as well as the desired item to be picked. The item indication is correlated with a group of compartmented bays where the specific item is located. While this system is an improvement over manual picking, there are still a number of deficiencies which prevent it from being of maximum efficiency.

Accordingly, it is an object of the present invention to provide a semi-automatic warehouse picking system that greatly increases picking throughput and accuracy without the large capital investment required for complete mechanical automation.

The present system provides an improved picking method which arises from the use of displays located on the flow rack adjacent to each product. Each display unequivocally tells the picker which items are required and how many of each items are to be picked. In this way, the possibility of transposition or other errors arising from hard copy interpretation are eliminated and the speed is significantly improved.

The present system is also versatile in that it can be adapted to two order filling modes with all pickers filling the same order or each picker filling a different order for his own zone. The use of this system provides that the goods may be placed directly into totes or put on a take away conveyor for down-stream packing.

The objects and advantages of the present invention will be clearly understood from the following description taken in conjunction with the drawings.

DETAILED DESCRIPTION OF A PREFERRED EMBODIMENT OF THE INVENTION

Figure 1:
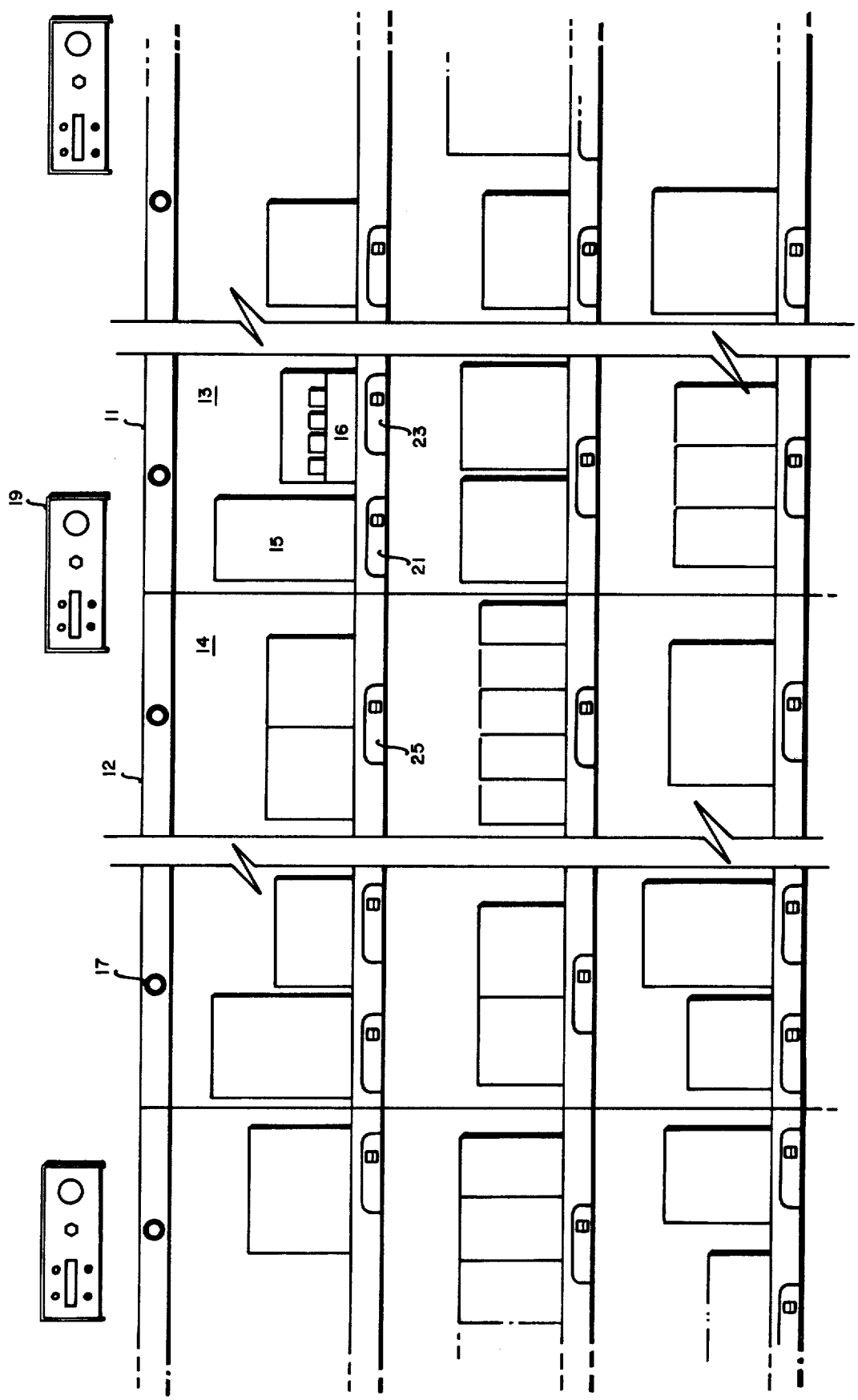
FIG. 1 is a schematic representation of the overall basic picking system of the present invention.

The schematic of FIG. 1 discloses a number of zones, each zone having a plurality of bays 11 and 12 with the number of bays being determined by the requirements of the particular picking operation. Each bay consists of a plurality of storage areas such as area 13 having items 15 and 16 therein. These items normally consist of open cases so that broken case picking may be implemented. A storage area may have only one item therein as shown in area 14. Pick display modules 21, 23 and 25 are provided for each item to be picked. The products are normally placed on inclined planes so that when the front case has been fully picked, the next case of that identical item will move down to replace it.

In order that the picker may quickly identify a bay associated with a current picking order, bay lamps 17 are placed above each bay to indicate that there is an item to be picked in that bay.

Also shown in FIG. 1 are order indicator control panels 19 which may be used when the zone picking feature of the present invention is to be employed. This control panel will be discussed in detail below.

Figure 2:
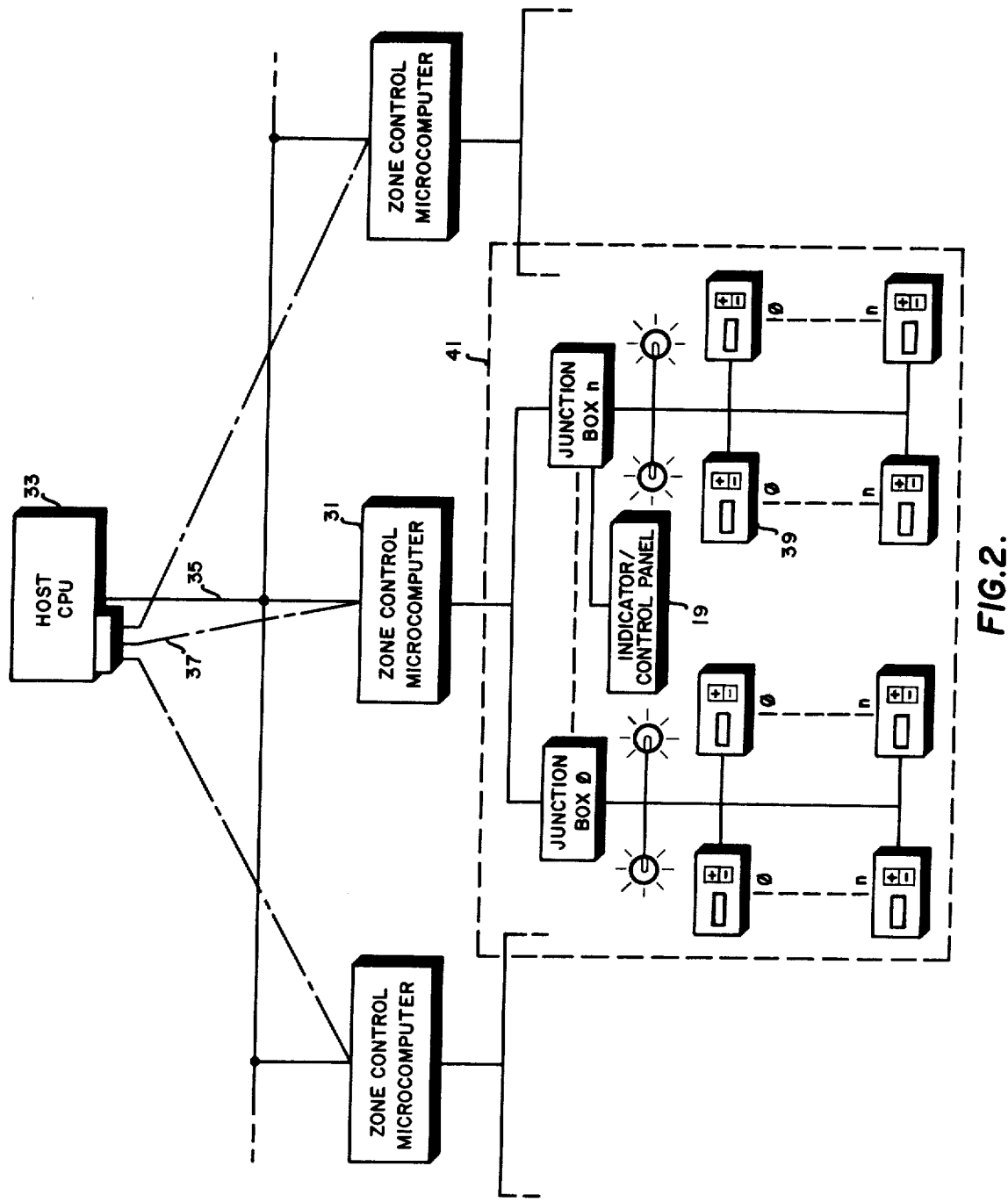
FIG. 2 is a schematic block diagram illustrating multiple zone controls used with the system of FIG. 1.

The overall operation of the system will be discussed in connection with the zone control of FIG. 2. The diagram depicts two methods in which several "Zone Controllers" may communicate with the host CPU (central processing unit).

As indicated, the present invention employs a data input device such as a microcomputer 31 to receive, store and process the order data from a host computer 33. In one method, host CPU 33 may communicate, via a shared single RS 232 output channel 35, to several zone controllers. Each zone controller distinguishes its specific data requirements in the data stream by accepting only those records from the host CPU that provide a match between the dedicated address in the address of the zone controller 31 and that in the data records transmitted from the host CPU 33.

An alternate host CPU to zone controller communication method is accomplished via an individual RS 232 port 37 at the host CPU for each zone controller in the system. Each zone controller then communicates with the host CPU via its own dedicated RS 232 data line.

A typical format of the data records from the host CPU 33 in the latter case would be as follows: Order No., 5 digits; Quantity, 2 digits, Location 3 digits.

It should be noted that if the information is of a simplified nature, a storage device such as a magnetic tape drive (not shown) could be used in place of the computer.

After data is received by zone control microcomputer 31 via either of the above methods, it is processed for presentation to the display modules 39.

The following section describes a more detailed processing of the received Host CPU Data as illustrated in zone 41.

Figure 3:
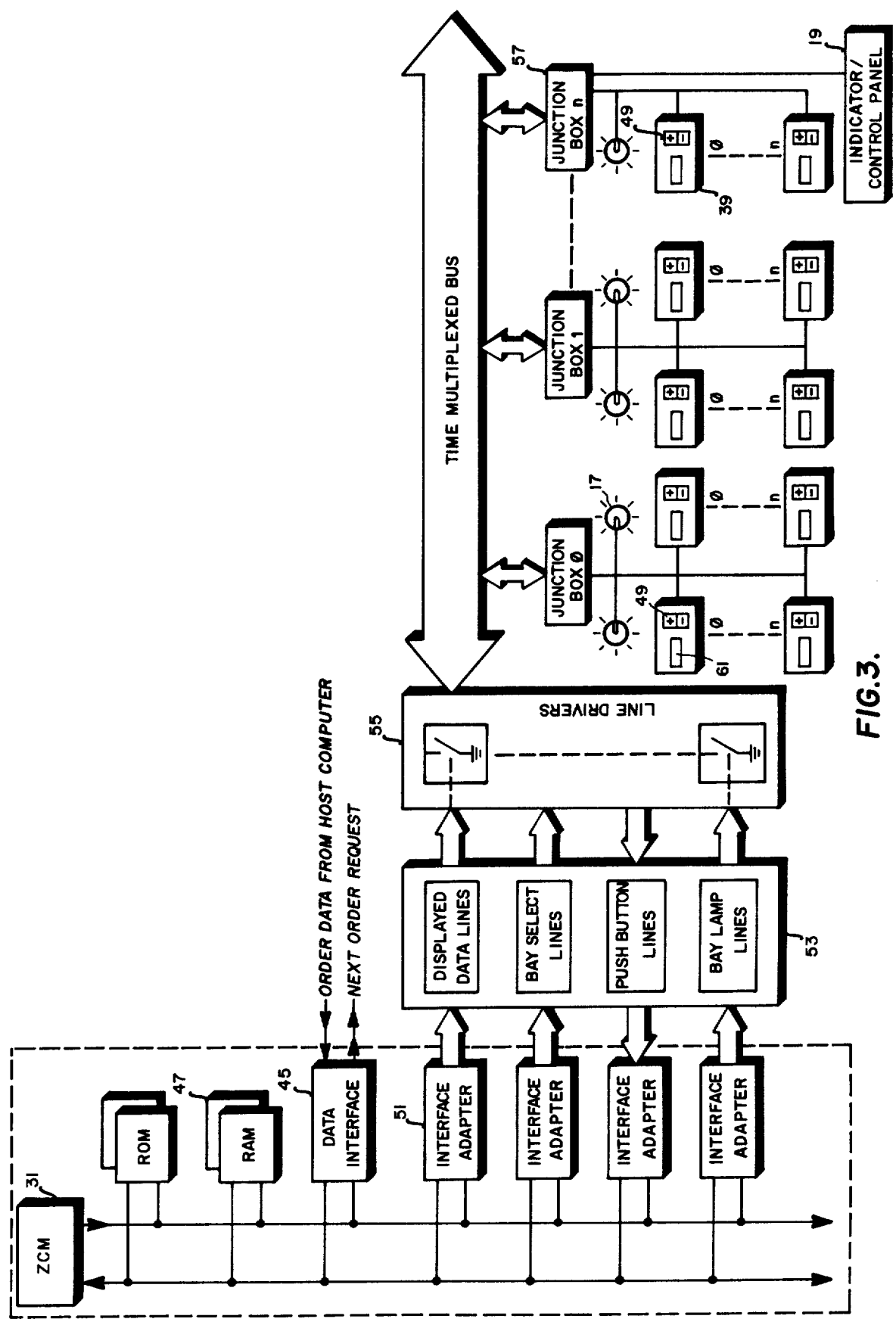
FIG. 3 is a detailed schematic block diagram of one of the zone controls of FIG. 2.

Turning now to FIG. 3, the data interface receiver 45 accepts the order data from host CPU 33, usually in bit character serial form, and presents it to the controller ZCM 31. Controller ZCM unit 31 then accepts this order data and formats it for storage in its RAM Memory 47 so that it can be presented to each zone's display module 39 one at a time. The ZCM unit also controls the communication and addressing function of the data lines to the various displays. Additionally, ZCM unit 31 also accepts data back from the display module switches 49 for initiation of subsequent stages such as extinguishing the display or changing the displayed count.

When data is to be presented to display modules 39, controller ZCM unit 31 outputs the display data via interface adapter 51. Interface adapters 51 connect the computer data and control buses to the computer's outside world. Interface adapters 51 interface to the low level line driver controller logic. Low level controller logic 53 provides signals to control the various lamps, displays, and push buttons in the system. Because of the long cables in the system, the system employs line drivers 55 that increase the power of the line driver control unit signals which in turn permits long-distance transmissions.

There are several combinations of line driver control units and line drivers: the display data line logic and its associated line drivers for driving the displayed quantity and order number on the system; the bay-select line control logic and its associated drivers for turning a bay's data lines ON and OFF; the push button line controller and its associated line drivers for the purpose of driving the push button data lines; the bay lamp line controller logic and its associated line drivers to drive the bay lamp data lines.

The driver transmissions normally terminate in junction boxes 57 which serve as a convenient branching and termination point to feed the display modules in their particular groups.

The pick quantity data appears on the two digit display modules 39 associated with each line item that has a pick requirement for the particular order. To eliminate unnecessary searching and walking, an indicator, or bay lamp 17, may be provided to tell the picker which bays have at least one item to be picked as indicated on the display modules.

Figure 4:
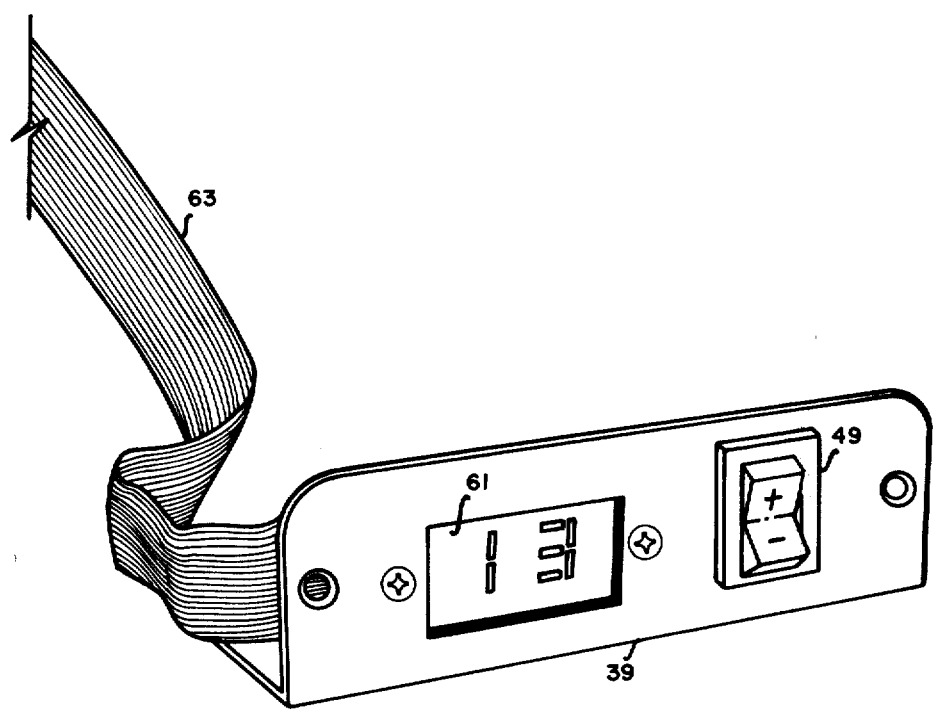
FIG. 4 is a perspective view of a picking display module which may be used with the present invention.

FIG. 4 illustrates one type of display module 39 which may be used with the present invention. There is included therein a pick quantity display 61 and a pick verification increment/decrement switch 49 both of which are connected to junction box 57 by means of a cable 63.

The operation of switch 49 is shown in detail in the following sequence table which refers to the + and − indicia on rocker switch 49.

| I/D ROCKER SWITCH ACTION | EVENT DESCRIPTION |
| --- | --- |
| Switch Depression: 1st | Either '+' or '−' momentary depression turns out quantity display If no depression is made within 5 seconds, initial quantity captured by computer |
| 2nd | Turns quantity display back on '+' puts system into increment mode '−' puts system into decrement mode |
| 3rd | Decrement/Increments original quantity by one Initiates decrement/increment time out cycle for approximately 5 seconds |
| 4th | Decrements/Increments previously quantity by one (now down/up by 2 units) Re-initiates decrement/increment timing cycle for another 5 seconds |
| 5th | Same as above (now down/up by 3 units) |
| nth | Same as above (now down/up by now 3 units) When decrement/increment timing cycle times out: - Quantity display is extinguished - Host CPU captures final quantity |
| | -continued |
| I/D ROCKER SWITCH ACTION | EVENT DESCRIPTION |
| | - Mode memory is reset |

Alternately, a single switch can be used to accomplish the same extinguish, decrement and increment function. Typically this is implemented by having the system normally in a decrement mode, and the mode is changed to increment by holding the switch down for a specified period of time. Otherwise, operation is as described above.

Accelerating Increment/Decrement Mode

Holding the '+' or '−' side of the rocker switch down for more than approximately 2 seconds will put the increment or decrement process in an automatic acceleration mode. Once in this mode the incrementation/decrementation process will occur automatically at successively higher speeds until the count is near the desired number. Further individual depressions as described above will lead to the final desired result.

Figure 5:
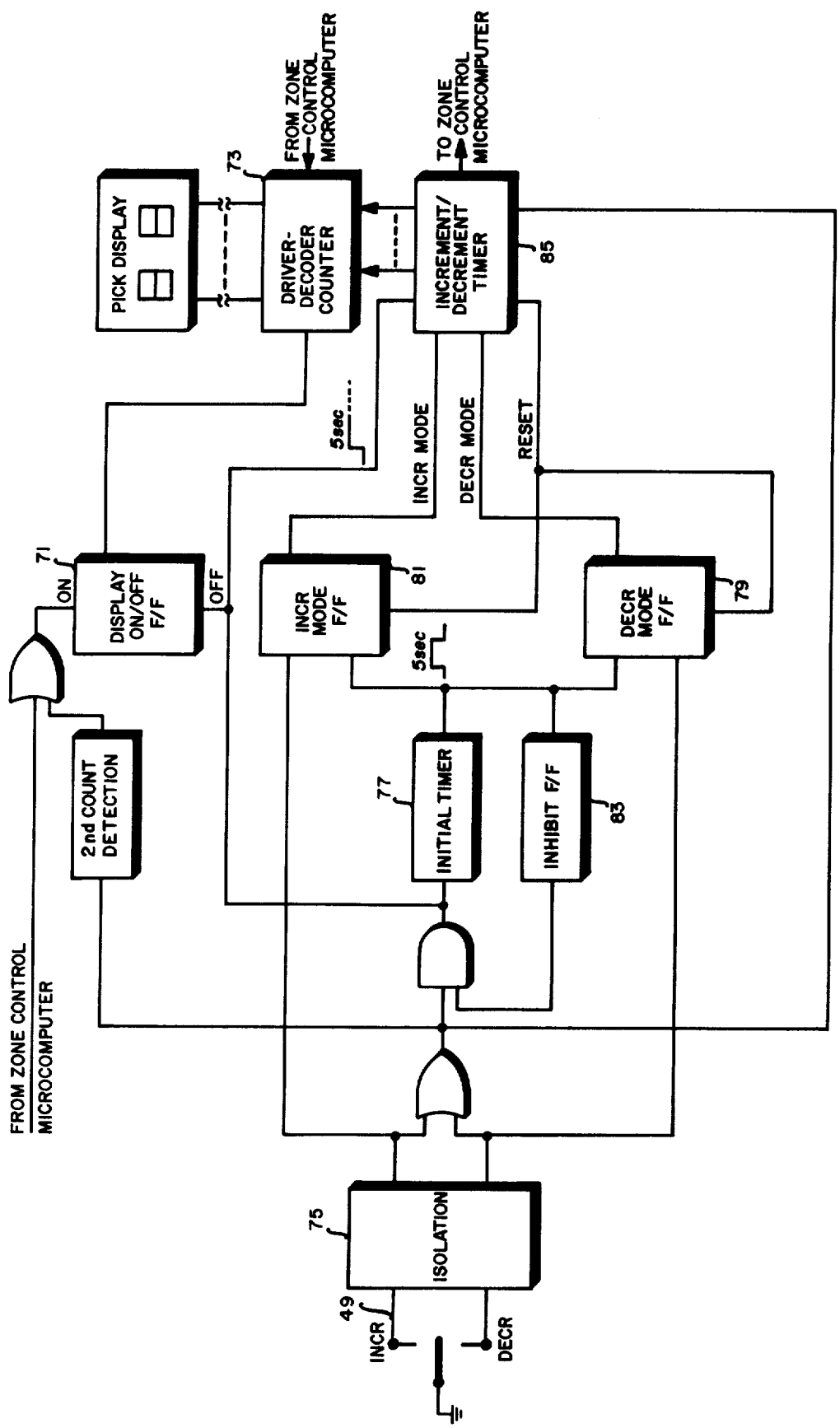
FIG. 5 is a detailed schematic block diagram of the incrementation/decrementation control used in the present invention.

Referring to FIG. 5, there is shown a preferred embodiment of an increment/decrement circuit. When a particular product is to be picked, its quantity display will be turned on via display On/Off F/F 71 from the zone control microcomputer. The quantity to be picked will also be inputted from the local zone control microcomputer into driver-decoder counter 73.

Once the quantity has been determined by the zone controller, input to the display and turned on, then either the indicated quantity is picked or it is incremented or decremented via increment/decrement switch 49.

Increment/decrement circuit debounce is provided by isolation circuit 75.

The first depression of either the increment or the decrement momentary toggle turns the quantity display off via the display On/Off F/F 71. The quantity displayed in the system at that time is captured if the system is not placed in either the increment or the decrement mode within five seconds of the initial turn out which is determined by initial timer 77.

If the initial count is to be decremented, the system is put into the decrement mode via the decrement switch and decrement mode F/F 79. If there is a requirement to increment the quantity, the system is put into the increment mode via the increment switch and increment mode F/F 81.

Inhibit F/F 83 prevents additional deprressions of either the increment or decrement switch from causing a new time out from initial timer 77 after the first has been initiated.

The display, having been put into either the increment or decrement mode, will then follow the existing count to be incremented or decremented in accordance with the mode selected. Once the increment or decrement process has been initiated, the operator has five seconds via increment/decrement timer 85 from the last increment or decrement action to make an additional increment or decrement in accordance with the mode selected. The process continues unless five seconds elapse from the last increment or decrement action. After approximately five seconds have elapsed from the last increment or decrement, the existing quantity at that time is captured by the computer, via the line "To zone Control Microcomputer", and the display is permanently blanked for the remainder of that order.

Driver-decoder counter 73 translates the internal BCD processing into a seven-segment decoder signal to drive the actual pick quantity as shown on the display module that the operator reads.

Figure 6:
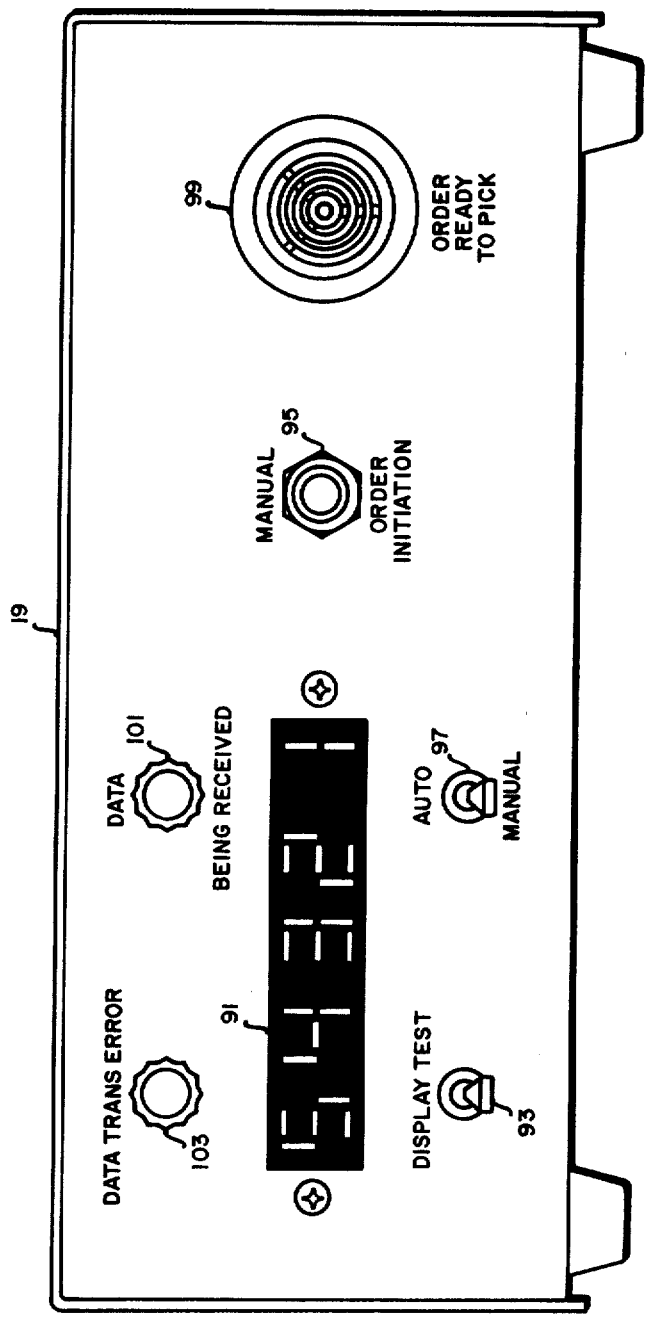
FIG. 6 is a front elevational view of an indicator control panel which may be used with the present invention.

One illustration of an indicator control panel 19 which may be used with the present invention is shown in FIG. 6. As indicated, these control panels interface with the data input device and provide the output to the various display indicators through a junction box. The control panel of FIG. 6 contains various displays and controls for operating and testing the system. A five digit display 91 appears on the control unit indicating the order number currently being picked in the zone. Integral system test modes are also included. One such test mode will exercise each bin indicator by operation of switch 93. Another mode will self test the system interface (not shown). Thus, as shown, there is a display test switch 93, a manual order initiation switch 95 and a switch 97 for placing the system or zone in either an auto or manual mode for response to the manual switching initiated by the picker. Additional indicators may be provided such as audio order-ready alert 99, data reception indicator and data transmission error indicator 103.

The above description and drawings are illustrative only, since the internal control circuitry may take many forms and still provide the desired system functions.

I claim:

1. An item handling system for aiding manual handling of said items by a human operator within a predetermined zone in accordance with output data including order number, quantity and location from a data input device comprising:
   a memory means;
   control means coupled to the output of said data input device including order number, quantity and location and to said memory means for formatting the data to be stored in said memory means and providing a preselected data output to a line driver means through an interface adapter means;
   at least one bay having a plurality of storage areas containing items to be picked;
   a display module adjacent each of said storage areas in said predetermined zone and coupled to the output of said control means through said interface adapter means to said line driver means;
   a changeable numerical display activated by said control means on each of said display modules for indicating the quantity of items to be picked;
   manually operated switch means on said display module for decrementing or incrementing the number indicated on said numerical display; and
   means for interconnecting said switch to said control means through said interface adapter means for transferring information relative to decrementing and incrementing to said control means.

2. The item handling system of claim 1 further comprising a junction box coupled between said control means and a selected number of said pick modules; and
   a bay lamp coupled to said junction box, said bay lamp being illuminated to indicate if any of said selected number of pick modules show a numerical display.

3. The item handling system of claim 1 further comprising timer means coupled between said switch means and said numerical display for providing a timing function in response to actuation of said switch means, said timing function initiating the start of a preselected time period during which said incrementation or decrementation may be provided.

* * * * *